United States Patent
Malamut et al.

(10) Patent No.: US 10,810,075 B2
(45) Date of Patent: Oct. 20, 2020

(54) GENERATING A SOCIAL GRAPH FROM FILE METADATA

(71) Applicant: EMC IP Holding Company LLC, Hopkinton, MA (US)

(72) Inventors: Mark Malamut, Aliso Viejo, CA (US); Scott Auchmoody, Laguna Beach, CA (US); Jeffrey R. Norton, Laguna Niguel, CA (US)

(73) Assignee: EMC IP HOLDING COMPANY, Hopkinton, MA (US)

( * ) Notice: Subject to any disclaimer, the term of this patent is extended or adjusted under 35 U.S.C. 154(b) by 156 days.

(21) Appl. No.: 15/960,433

(22) Filed: Apr. 23, 2018

(65) Prior Publication Data
US 2019/0324840 A1 Oct. 24, 2019

(51) Int. Cl.
*G06F 11/00* (2006.01)
*G06F 11/07* (2006.01)
*G06F 16/28* (2019.01)

(52) U.S. Cl.
CPC ........ *G06F 11/0793* (2013.01); *G06F 11/079* (2013.01); *G06F 11/0751* (2013.01); *G06F 16/285* (2019.01)

(58) Field of Classification Search
CPC ............. G06F 11/0793; G06F 11/0751; G06F 11/079; G06F 11/0781; G06F 11/3072; G06F 11/3082; G06F 16/285
See application file for complete search history.

(56) References Cited

U.S. PATENT DOCUMENTS

2007/0027917 A1* 2/2007 Ariel ..................... G06F 16/285

* cited by examiner

*Primary Examiner* — Joseph D Manoskey
(74) *Attorney, Agent, or Firm* — Workman Nydegger

(57) ABSTRACT

One example method includes identifying, in a computing system, an aggregate data set that includes both data used by a first user and data used by a second user, examining file metadata associated with the data in the aggregate data set and, based on the examination of the file metadata, determining whether or not any data in the aggregate data set is shared by the first and second users. When a determination is made that some data in the data set is shared by the first and second users, the method includes further determining how much of the data is shared, assigning a strength of connection between the first user and the second user based on the extent to which the first user and second user share data and, based on the strength of connection, taking an action to improve operation and/or configuration of the computing system.

20 Claims, 6 Drawing Sheets

GENERATING A SOCIAL GRAPH FROM FILE METADATA

FIELD OF THE INVENTION

Embodiments of the present invention generally relate to the use of data analysis as a basis for identifying and resolving problems relating to computing systems. More particularly, at least some embodiments of the invention relate to systems, hardware, software, computer-readable media, and methods directed to identifying a relative connection strength between users and/or groups of users associated with a computing system. The relative strength of the connection can be used, among other things, as a basis for further investigation, identification of problems and their likely causes, and identification and implementation of problem solutions.

BACKGROUND

The complexity of modern computing systems can often make it difficult to identify problems, their likely causes, and potential solutions. While these difficulties can be present in any type or size of computing system, they often arise in the context of computing systems whose users reside in different respective geographical locations. This circumstance may be particularly prevalent, for example, for enterprises whose developers and other personnel are organized by teams or groups, rather than by geographical location or job description. For example, a single team may be composed of multiple collaborating developers, each of whom resides in a different country. Likewise, a computing system may include geographically dispersed elements, such as servers for example, that are each located in different respective geographical areas.

Thus, in environments such as these, when a problem occurs, a significant amount of time and effort may be involved in attempting to identify causes and solutions relating to that problem. These same considerations, and others not specifically enumerated here, can also make it difficult to identify potential problems, and to take preventive action regarding such potential problems, before they occur.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
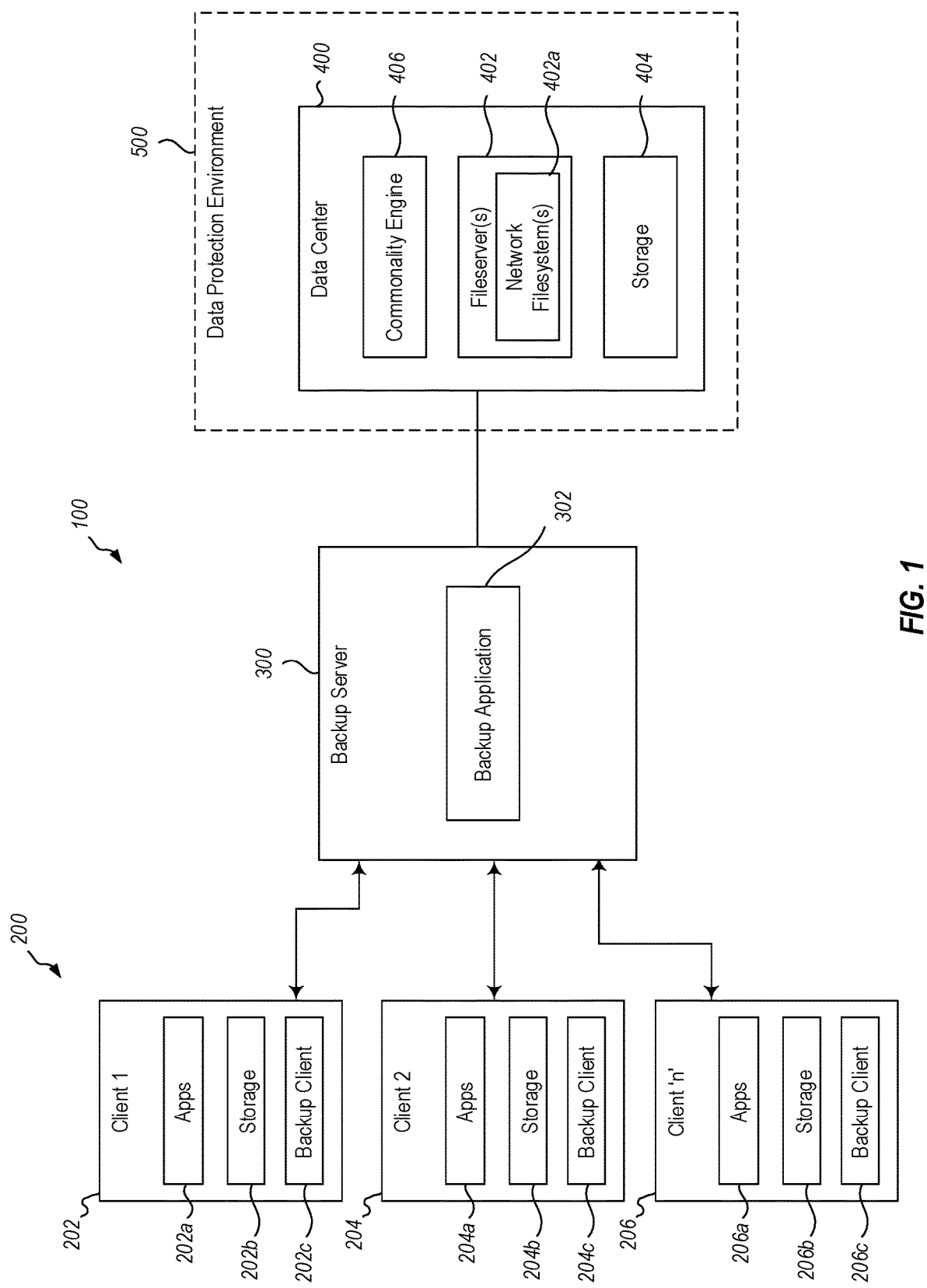
FIG. 1 discloses aspects of an example operating environment including a data protection environment with a commonality engine.

Embodiments of the present invention generally relate to the use of data analysis as a basis for identifying and resolving problems relating to computing systems. More particularly, at least some embodiments of the invention relate to systems, hardware, software, computer-readable media, and methods directed to identifying a relative connection strength between users and/or groups of users associated with a computing system. One, some, or all, of the functions disclosed herein relating to determining connection strength may be implemented by, and/or at the direction of, a commonality engine, example embodiments of which are disclosed herein.

In general, the relative strength of the connection can be determined on objective and determinable bases, such as the extent of the commonality of data shared and/or used by multiple users, where a relatively higher level of commonality between users is deemed to correspond to a relatively stronger connection between those users. As well, the body of data to be used in determining strength of connection can be tuned to account for effects that may compromise the analysis and/or to implement effects that may improve the analysis. In some embodiments, the strength of connection between/among multiple users may be rendered in graphical form.

Using the strength of connection information, inferences and conclusions may be drawn about the users individually and/or collectively, and can then be used to help identify problems and their causes, resolve problems, and/or identify potential problems before they occur so that preventive action can be identified and taken. As disclosed herein, such functionality has a variety of practical applications, in data protection environments, as well as in other environments.

In general however, various actions may be taken, or not taken, based on one or more strength of connection determinations. These actions taken may involve, among other things, a modification to one or more operational and/or structural aspects of a computing system with which the users are associated. Such actions may, for example, improve an operational and/or structural aspect of the computing system. For example, if a user is cut off from accessing certain data, or locked out of a particular application, based on a strength of connection analysis, the security of the computing system may thereby be improved. As another example, an overly strong connection between users may suggest that one user is accessing data that he should not be able to access, and the computing system may then be reconfigured to prevent such access.

As the foregoing examples illustrate, embodiments of the invention may improve the operation of a computing system, or element of a computing system, and/or may facilitate resolution of a technological problem relating to the configuration and/or operation of a computing system.

The actions taken based on a strength of connection analysis may be passive, or active, in their nature. An example of a passive action would be to implement monitoring of the activities of a particular user. An active action may be to prevent a user from accessing certain data. The implementation of the passive and/or active actions may be apparent to a user, or may be transparent to the user.

Advantageously, the existence and strength of connections can be identified without requiring the users to take any special action regarding the data that they share with others. Thus, the users are not burdened with additional work or efforts to enable the disclosed processes. Moreover, user compliance or cooperation is not needed to enable the functionality disclosed herein. Further, the strength of connection determination and evaluation processes disclosed herein may be implemented without the involved users being aware of such implementation.

Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in a data protection environment such as a cloud services environment that may be, or include, a data protection system operating environment that includes one or more storage systems or storage environments including primary storage and data protection storage. In some specific example embodiments of the invention, at least some functionality may be provided by, or implemented in connection with, a platform such as the Dell-EMC DataDomain data protection platform, and associated systems, methods, and components, although use of this particular platform is provided only by way of illustration and is not required.

The storage environment may take the form of a cloud storage environment, an on-premises storage environment, and hybrid storage environments that include public and private elements, although the scope of the invention extends to any other type of storage environment as well. More generally, embodiments of the invention can be implemented in any suitable environment, including a cloud services environment, and the scope of the invention is not limited to the example environments disclosed herein. Any of these cloud environments, or other operating environments, can take the form of an operating environment that is partly, or completely, virtualized.

The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications and data include email applications such as MS Exchange, a database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a plurality of clients 200, such as clients 202, 204 and 206. Each of the clients 200 may host one or more applications 202a, 204a and 206a, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be backed up as described below. The backup data can be restored to local storage 202b, 204b and 206b. The clients 200 may each also include a respective backup client application 202c, 204c and 206c.

With continued reference to FIG. 1, the example operating environment may further include a backup server 300 that includes a backup application 302. The backup application 302 may cooperate with one or more of the backup clients 202c, 204c, or 206c to backup client 202, 204 and 206 data at a datacenter 400 of a data protection environment 500. The backup application 302 may also cooperate with one or more of the backup clients 202c, 204c, or 206c to restore backed up client 202, 204 and 206 data from the datacenter 400 to the clients 202, 204 and 206. In some embodiments, the backup server 300 may be an EMC Corp. Avamar server or an EMC Corp. Networker server, although no particular server is required for embodiments of the invention.

The data protection environment 500 may be implemented as a Dell-EMC DataDomain data protection environment, although that is not required. As indicated, the data protection environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

Finally, the datacenter 400 may include a commonality engine 406. In general, and as discussed elsewhere herein, the commonality engine 406 may perform a variety of functions. For example, the commonality engine 406 may examine file metadata associated with data stored at the datacenter 400, and then make a determination as to the strength of a connection between two or more users based on the file metadata. One example of such file metadata is metadata that indicates the extent to which two or more users share particular data, such as files, although the scope of the invention is not limited to this particular type of file metadata. The commonality engine 406 may also recommend, or automatically implement or cause the implementation of, one or more actions based on the determined strength of connection, or, alternatively, may recommend that no action be taken, or that action be deferred. File metadata may also indicate the frequency with which particular data was used by one or more users, and when the data was used by the one or more users.

In the illustrated example, the commonality engine 406 resides at the datacenter 400 of the data protection environment 500. However, this arrangement is not required and, in other embodiments, the commonality engine 406 may reside elsewhere, such as at the backup server 300 for example.

B. Example Host and Server Configurations

Figure 2:
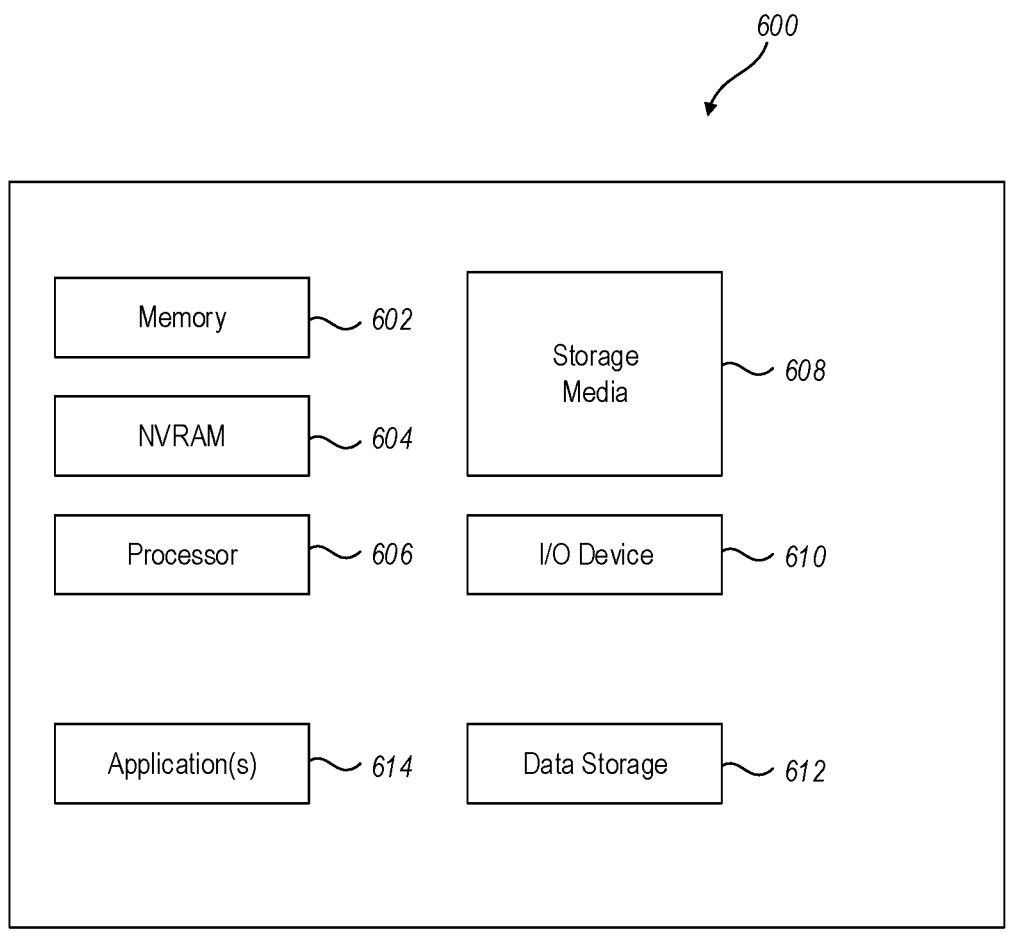
FIG. 2 discloses aspects of an example host configuration.

Turning now to FIG. 2, one or more of the clients 200 and its components, and fileserver 302 and its components, can take the form of a physical computing device, one example of which is denoted at 600. As well, where any of the aforementioned elements comprise or consist of a VM, that VM may constitute a virtualization of any combination of the physical components disclosed in FIG. 3.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components of the physical computing device can take the form of solid state device (SSD) storage. As well, one or more applications 614 are provided that comprise executable instructions. Such executable instructions can take various forms including, for example, a commonality engine.

C. File Metadata and Strength of Connection

As part of a data protection process, hashes may be computed that represent files, or fragments of a file. As such, the hashes constitute one form of file metadata. In general, a commonality engine can analyze the hashes and/or other forms of file metadata, across multiple users to determine various measures of file or sub-file commonality that can be used in a variety of ways. For example, analysis of the file metadata can indicate the strength of a connection between users without requiring the user to take any action or to even be aware of the analysis. More particularly, strength of connection may be determined based on measurements of data similarity, as represented by the file metadata, and the data may be conceptually or graphically presented in the form of a "social graph." In general, such a social graph may include a plurality of nodes, each representing a user, and lines connecting the nodes, where the thickness of a line represents the relative strength or weakness of the connection.

Analysis of file metadata to determine the strength of a connection between two or more users can either be performed statically, that is, once for a single point in time, or dynamically, that is, on multiple occasions over a period of time. In general, various actions can be taken, or not taken, based on one or more strength of connection determinations. The strength of connection determinations can be made on an ad-hoc basis, a recurring basis, or any other basis, and may be manually initiated by a user such as an administrator, or automatically initiated, such as in response to the occurrence or non-occurrence of an event. One such event may be a determination that a connection between users has a particular strength. The actions taken can involve, among other things, a modification to one or more operational and/or structural aspects of a computing system with which the users are associated. Tables or other mechanisms may be used to correlate one or more particular actions with particular strength of connection values or ranges of values.

Among other things, file metadata may be used to identify data that is common between users, that is, data that is shared by the users. Where no data, or at least no data of interest, is shared between users, it may be deemed that the users have no connection. Correspondingly, where a connection does exist between users, by virtue of the fact that those users share some data of interest, the strength of that connection may be considered as a function of the shared data. Thus, embodiments of the invention identify, through the use of file metadata, the data that is shared by two or more users.

However, different shared data may have relatively greater, or lesser, significance in determining the strength of connection between the users who share that data. As such, corresponding weights may be assigned to different data, where the relative weight assigned is reflective of the relative importance of the associated data in determining the strength of connection between the users. Such weights may be determined, for example, with reference to the data class to which particular data belongs. Examples of data classes include data files, operating system files, images, video, application data, emails, phone calls, voice messages, and text messages. These classes can be determined by examining file metadata, such as file type, sub-tree location within a file system, or other file metadata attributes. To briefly illustrate, a file may have the extension .jpeg. The file metadata '.jpeg' thus indicates that the file falls in the data class of images.

A given data class may be consistently accorded the same weight for all analyses, or may be accorded different weights, depending upon the analyses performed. As well, a data class may be accorded no weight at all, or may be accorded a maximum weight that always exceeds the weight of any other data class.

In at least some instances, data common that is common to two or more users may belong to a class of data that can be excluded from an analysis of connection strength. This may be done where, for example, the class of data provides little or no insight as to the strength of the connection between two or more users. Such a circumstance may occur with respect to data, such as application files, that are commonly used by most or all users in a computing environment. Because such data is used to most/all users, it may not be useful in assessing a strength of connection between particular users. Thus, generic common files may be masked out. That is, in order to effectively compute commonality of data and, thus, strength of connection between users, certain file data such as operating system and common application files, such as MS Office for example, may be excluded from the analysis. Elimination of such data from the analysis enables the commonality engine to operate more efficiently, and to also more accurately determine connection strength between two or more users of interest. Following are some examples that serve to illustrate various aspects of the disclosed concepts.

As disclosed herein, a method and system can be constructed and implemented that can determine the strength of connection between users based on commonality of data shared between users. This can be used to compute a variety of what may be referred to as social connection measurements. In general, it would be expected that people working in the same group would have a higher strength of connection with each other than with people that work in different groups. This data can be used in a variety of ways.

For example, team effectiveness is an important measurement to many organizations. Teams that work well together and co-operate well are more effective than those that do not. Team effectiveness can be evaluated in terms of the connection strength between members of the team. That is, using data commonality strength as a static measure and the velocity, and acceleration, of changes in the strength of connections can provide useful insights regarding the effectiveness of a particular team internally, and/or with respect to other individuals and/or teams.

Thus, by examining these attributes within the confines of teams, an organization can determine one measurement of team effectiveness. This data can be compared between teams and when evaluating the actual effectiveness of a team, an organization can help guide lower performing teams by taking actions that encourage data sharing between members. This can be done through a variety of team-building activities.

To illustrate, higher performing teams, such as a code development team for example, would be expected to have higher connection strength which can be measured through this method. Teams with relatively lower strengths and effectiveness measurements can therefore be easily identified. This also can be applied to members within a team. Teams and/or team members with relatively low connection strengths can then be the subject of further evaluation, and implementation of corrective action. For example, a relatively low connection strength within a team may indicate that a work process performed by the team, such as a code development and testing process for example, is inefficient and/or ineffective, and should be modified. Remedial action can then be taken to improve the work process, such as by making the process more efficient and effective.

To continue with the aforementioned team example, it may be the case that the efficacy of a team will change over time, where this efficacy can be expressed in terms of changes in a digital communication efficacy (DCE) of that team. The DCE, in turn, is a function of the collective strength of the connections between users within the team such that a relatively higher DCE corresponds to relatively stronger connections between users in the team, while a relatively lower DCE corresponds to relatively weaker connections between users in the team. Thus, the use of DCE makes it possible to determine if a team is becoming more efficient, is stagnant, or is becoming less efficient, by examining changes in connection strength over time. As strength wanes between team members, it may be desired to evaluate what is happening to the team. Thus, the DCE can be used as a team performance metric.

In addition to identifying connections between users, and the relative strength of those connections, embodiments of the invention may also be used to identify connections between users that were either not expected to be found, or were unexpectedly strong. Such unexpected connections, and unexpectedly strong connections, may be found within a team of users and/or between users who have no apparent affiliation.

To illustrate with another example, a "bad actor" may be identified from time-to-time within an organization. A bad actor may be, for example, an individual who is involved in insider trader, selling trade secrets or otherwise causing harm to an organization or enterprise. When a bad actor is identified, it can be useful to find others that have a strong connection to this person. Connection strength can help identify those connected to a bad actor and thereby enable the organization to take action if deemed appropriate.

In addition to considering attributes such as the strength of connection between users, embodiments of the invention may also consider attributes such as the velocity of the common data. That is, the data velocity may be computed by looking at the change in strength of connections, whether an increase or decrease in strength, over a time range. Such an analysis would tend to indicate whether a connection is increasing or decreasing in strength. The analyses may also consider the acceleration of data, that is, the rate at which the strength of the connection changes. This type of analysis would tend to indicate how quickly the strength of connection is changing. Thus, for example, if a strength of connection between a suspected bad actor and another user is increasing quickly, that may suggest to administrators that action should be taken sooner rather than later. Information and analyses such as these may help an organization identify a list of possibly complicit actors.

In more detail, a strong connection between the bad actor and another user may suggest that the other user is likewise involved in the same or similar bad acts, while a relatively weak connection between the bad actor and another user may suggest that the other user is not involved in those bad acts. That is, an inference, which may have a relative strength or weakness, may be drawn that users who share a relatively significant amount of data with a bad actor may be, although are not necessarily, bad actors themselves. The inference alone may, or may not, be enough to definitively identify others as being involved, but can at least help to narrow the field of possibly involved users, thus enabling a relatively more rapid identification and resolution of the problem.

To continue with the illustrative example of the bad actor, various actions can be taken based on the strength of connection determination. In general, such actions, whether in this example, or in any other scenario, can involve, among other things, a modification to one or more operational and/or structural aspects of a computing system with which the users are associated.

For example, and assuming that a relatively strong connection has been found between the bad actor and another user, a system administrator could use that information as a basis to modify some aspect of the operation of a computing system used by the two users. To illustrate, an administrator may modify the network data security settings so that the two users cannot delete, modify, or copy data. As another example, the users can be prevented from accessing certain data. In still another example, the system administrator can lock the users out of the computing system entirely.

In at least some instances, the action taken with respect to the configuration and/or operation of the computing system could be passive, rather than, or in addition to, active measures such as those just described. One example of a passive action would be to implement a heightened monitoring of the activity of the user when the user is on the system. In this example, the passive action may also be transparent to the user, that is, the user may not be aware that the passive action has been taken.

D. Determining Strength of Connection

The following section describes methods of determining the extent to which data is shared between a set of users and, thus, the strength of the connections between those users. While the extent of data items in common between users is used to compute this strength, it is noted elsewhere herein that certain classes of files can ameliorate the strength of the measurement. Thus, in at least some embodiments, standard classes of files, such as operating system, and application files for example, are excluded from the analysis.

Figure 3:
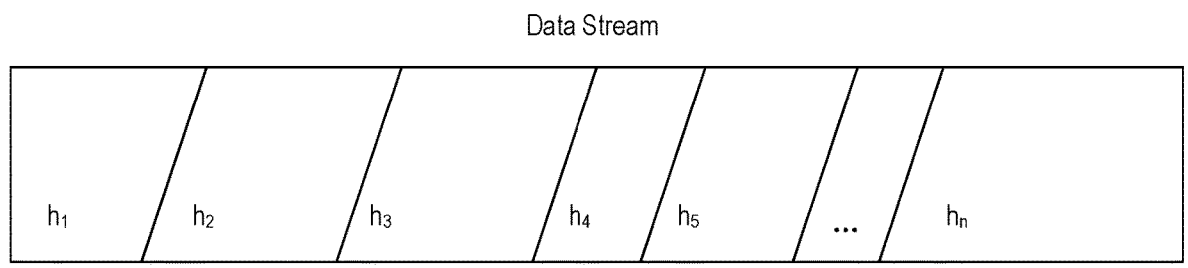
FIG. 3 discloses aspects of an example data stream and associated hash configuration.
Figure 4:
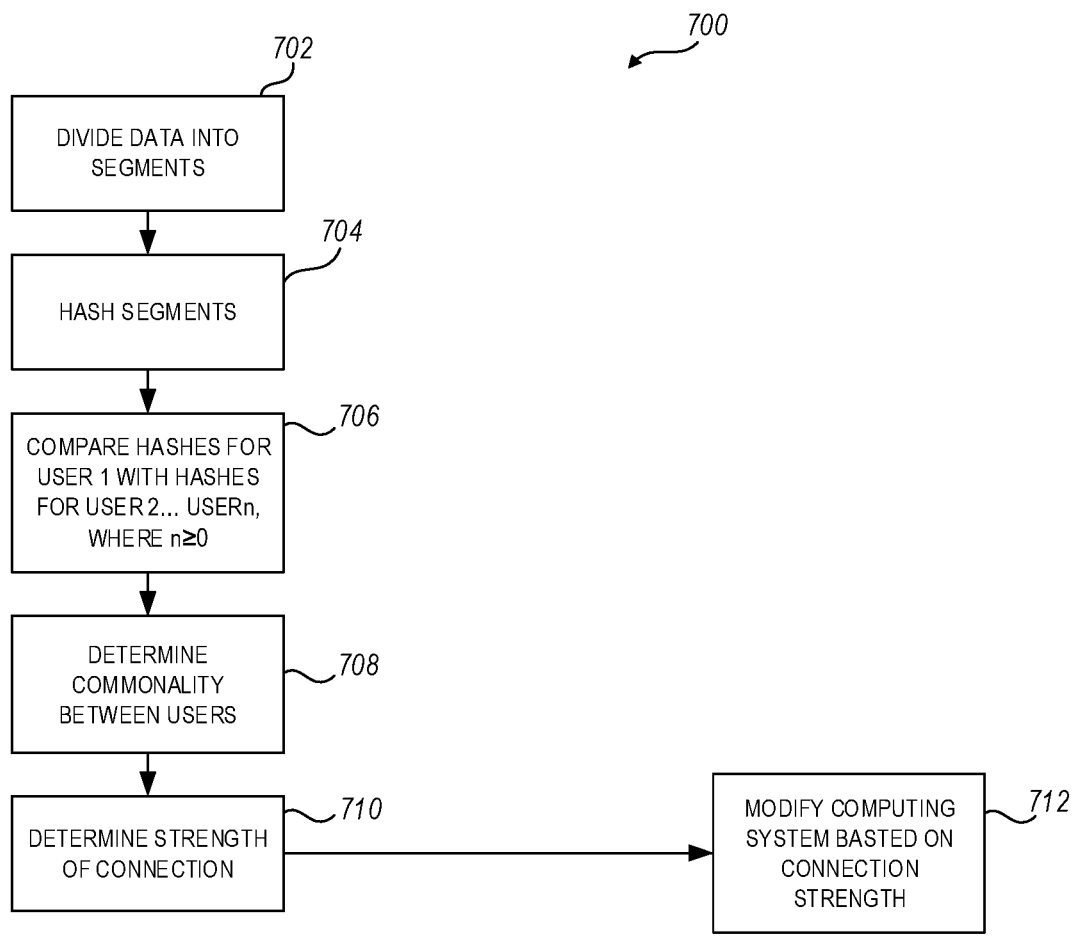
FIG. 4 discloses aspects of an example method for determining a strength of connection between users.

With reference now to FIGS. 3 and 4, one example process denoted generally at 700, which may be performed by and/or at the direction of a commonality engine, begins by dividing the data, that is, the data accessed by a user, into a number of small variable and deterministic segments 702. Each segment is then hashed 704, the respective hashes for two or more users are compared 706, and then the number of hashes (representing the segments) that are common between a set of users is computed 708 which yields a measurement of strength of connection 710. Thus, the process 700 is performed for each of the users of interest so as to enable comparison of the hashes associated with each respective user. If the strength of connection is determined 710 to meet or exceed a predetermined threshold, then one or more corresponding actions may be taken 712, based on the strength of connection, to modify one or more aspects of a computing system, such as the configuration and/or operation of the computing system.

In more detail, the data stream for each user is broken into segments 702 and each segment $S_i$ is hashed into hashes $h_i$ 704, as indicated in FIG. 3. This process produces a set U1 (for User 1) comprised of $\{h_1, h_2, h_3 \ldots h_n\}$. A data set U2 (for User 2) comprising $\{h_1, h_2, h_3 \ldots h_m\}$ associated is compared 706 to the data set U1. The commonality ratio, defined as the size of (U1∩U2) over the size of the union of (U1∪U2), corresponds to the strength of the connection between User 1 and User 2, that is, a relatively higher commonality ratio corresponds to a relatively stronger connection between those users and, correspondingly, a relatively lower commonality ratio corresponds to a relatively lower connection between those users.

In general, the range of possible commonality ratios is bounded by 0 at the low end and 1 at the high end. Thus, at the upper end of commonality ratio values, a commonality ration of 1 signifies complete identity between the data that is common to both users and the aggregate set of all data used by those users. That is, the data that is common to both users is no more or less than the set of all data used by those users. At the lower end of commonality ratio values, a commonality ratio of 0 signifies a complete lack of identity between the data that is common to both users and the set of all data used by those users. Put another way, there is no data, in the aggregate set of user data, that is used by both users.

It is noted that for determining similarity of data as between User 1 and User 2, the cost of the algorithm may be expressed as $O(n^2)$ (where O is the number of computing operations that must be performed), so that for 'k' users, the cost is $O(n^k)$. This approach may be effective for relatively small 'k' values, but other approaches may be called for when relatively large 'k' values are involved. Thus, an alternative method for determining similarity between user data is discussed below With reference now to FIG. 5, details are provided concerning a further method, denoted generally at 800, for determining a strength of connection between two or more users. With respect to the method 800, let U1 represent the data set for User 1, and U2 represent the data set for User 2. Then, the method 800 may begin at 802 where hashes are calculated for each set U1 and U2 or, more generally, for Un data sets where n≥2.

Next, a bloom filter B is created 804 for each of the data sets. The size of the bloom filter can be based upon the number of hashes $H:\{h_i, i=1$ to $n\}$ in each data set, the number of users U being analyzed and the number of bits from each hash. The hash set H may be subsampled to into set $S:\{S_i, i=1$ to $n\}$. In general, the subsample size may be selected such that it does not consume too much memory, while reducing or minimizing saturation that may cause a loss of fidelity. That is, the bloom filters should be prevented from containing all 1s.

Figure 5:
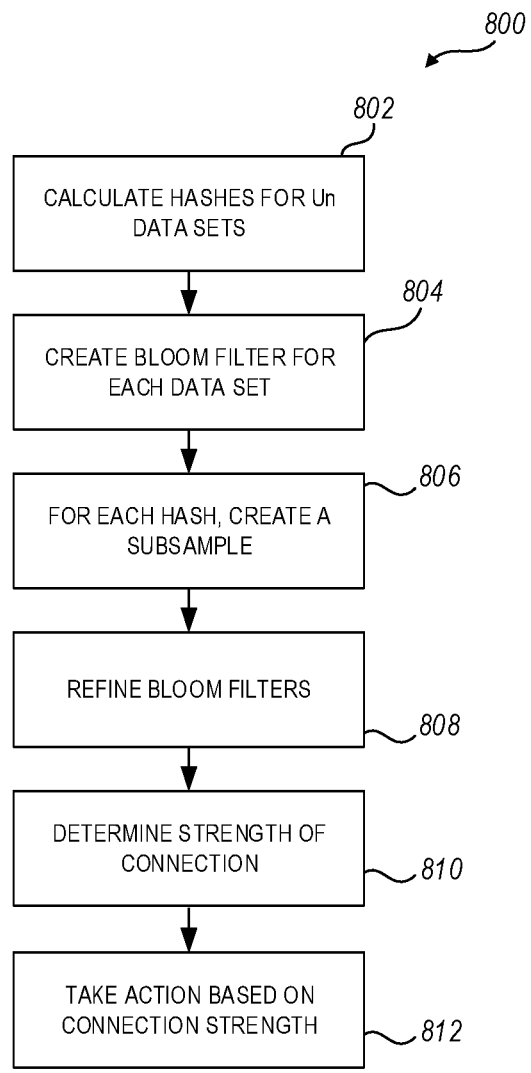
FIG. 5 discloses aspects of another example method for determining a strength of connection between users.

With continued reference to FIG. 5, let $B_x$ be the bloom filter for user x, for example, $B_1$ is the bloom filter for User 1, and let M be the hash subsample mask. Then, for each hash $h_i$ in H (see, e.g., FIG. 3) create 806 a subsample $s_i$ such that $s_i=h_i$ AND M. Then, let $B_x=B_x$ OR $s_i$ for all $s_i$ At this point, $B_x$ is the fully loaded bloom filter that represents all of the hashes of the data set for User x.

The method now advances to 808 where the bloom filter for each user is refined, such as by removing from the data set data that is not useful in determining strength of connection. As noted elsewhere herein, such day may comprise, for example, operating system data and standard application data. Thus, let $B_b$=the bloom filter for derived from the hashes of the operating system and the standard application, and let $B_x=B_x$ AND $\sim B_b$ for all users. Now, the refined bloom filter represents the user-specific data, but the operating system and application data have been filtered out.

The commonality of data and, thus, the strength of connection, between users U1 and U2 can now be determined 810. As noted earlier, the strength of connection can be expressed in terms of digital communication efficacy, or DCE, where a relatively higher DCE corresponds to a relatively stronger connection between users, while a relatively lower DCE corresponds to a relatively weaker connection between users. Thus, the DCE as between User 1 and User 2 can be determined using the following relationship:

$$DCE_{12} = \frac{\text{count\_ones}(B_1 \text{ AND } B_2)}{\|B\|}$$

where 'count_ones' is the count of 1 s and $\|B\|$ is the size of the bloom filter. Finally, one or more actions may be taken, or not, 812 based on the determination of connection strength between User 1 and User 2. As noted in the discussion of FIG. 4, such actions may involve modifying one or more aspects of a computing system, such as the configuration and/or operation of the computing system, although the scope of the invention is not limited to these example actions.

It should be noted that in some embodiments, no consideration is given to how often shared data is used by any particular user, or users. Rather, consideration is only given to whether or not a particular user used certain data either generally, or within a particular time frame, or at a particular time. In other embodiments however, the frequency with which a user used particular data may be considered. For example, if a user uses shared data only once, or only a few times, relative to the frequency with which another user uses the shared data, it may be concluded that while there is a connection between the users, that connection is weak, or that connection may be deemed not to exist. This functionality may be useful where, for example, a user uses a file or data set by accident or inadvertently, thus giving rise to an incorrect inference that some connection exists between that user and another when, in fact, there is no such connection because the first user only inadvertently accessed the data.

While not specifically illustrated in FIGS. 4 and 5, the example methods may include additional processes. For example, one or both of methods 700 and 800 may include a process for accessing storage 404 at a data center 400 to examine the contents of a client 200 data stream. As well, the methods 700 and 800 may also include a process for accessing a metadata server (not shown) in order to examine metadata concerning part or all of one or more client 200 data streams. The aforementioned example processes can be performed in any order.

E. Social Graph Based on File Metadata

Figure 6:
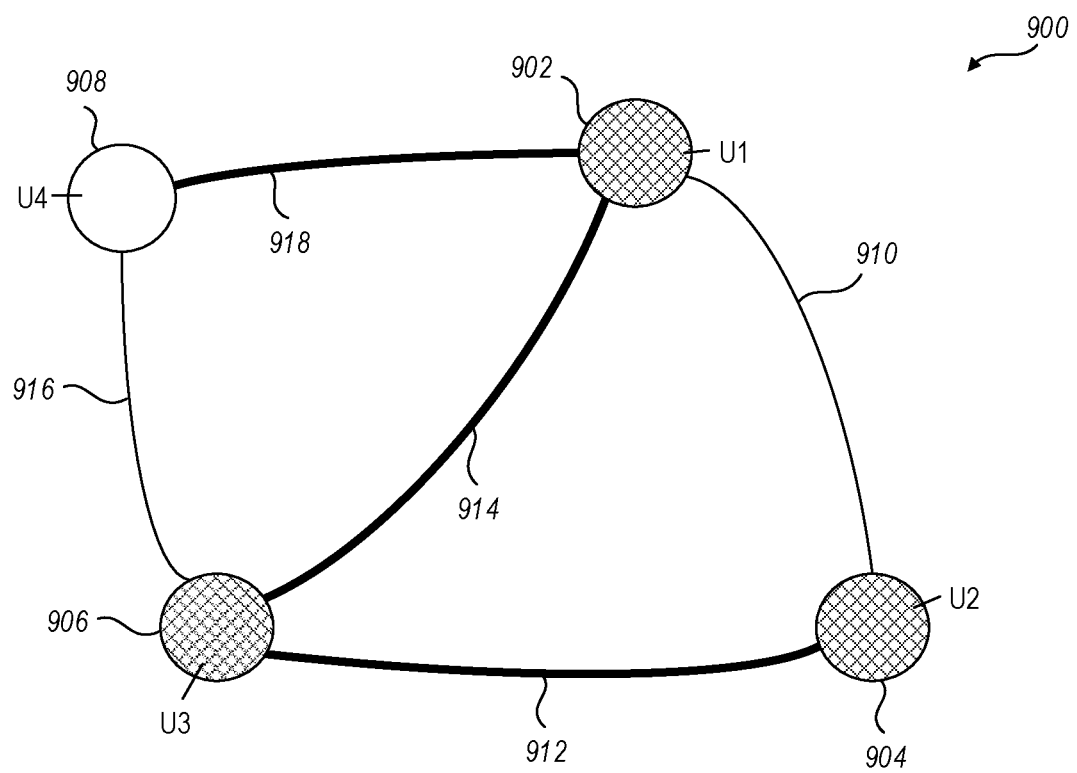
FIG. 6 discloses aspects of an example social graph showing the existence and strength of connections between users.

Directing attention finally to FIG. 6, an example of a social graph 900 based on file metadata is disclosed. In general, a social graph is a visual way of depicting where connections exist between users in a computing environment, and the relative strength of those connections. That is, and as explained elsewhere herein, the social graph 900 is based on file metadata that indicates the extent to which data is commonly used by one or more users. The social graph can be generated, for example, by a commonality engine using the results of analyses performed by, and/or at the direction of, the commonality engine.

As indicated, the social graph 900 can include a plurality of nodes, such as nodes 902, 904, 906 and 908. Each of the nodes 902, 904, 906 and 908 corresponds to a respective user in a computing environment, and may be connected to one or more other nodes. Some nodes may not be connected to each other. In the example of FIG. 6, node 908 is connected to nodes 902 and 906, but is not connected to node 904. On the other hand, nodes 902 and 906 are each connected to all of the other nodes. Particularly, node 902 is connected to nodes 904, 906 and 908, while node 906 is connected to nodes 902, 904 and 908. Finally, node 904 is connected to nodes 902 and 906, but is not connected to node 908.

As further indicated in FIG. 6, the strength of the connections between and among the various nodes 902-908 may be different. Thus, for example, the connection 918 between nodes 902 and 908, the connection 914 between nodes 902 and 906, and the connection 912 between nodes 906 and 904, are relatively strong, as indicated by the relative thickness of those lines. As another example, there is no connection between node 908 and node 904. Finally, the connection 916 between node 906 and node 908, and the connection 910 between node 904 and node 902 are relatively weak, as indicated by the fact that those lines are relatively thinner.

Thus, the social graph 900 provides a relatively simple and effective way of visually illustrating the existence and strength of connections between users in a group. As is apparent from FIG. 6, sub-groups of users, and different groups of users, can be defined, and corresponding social graphs generated for those groups.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising performing the following operations:
   identifying, in a computing system, an aggregate data set that includes both data used by a first user and data used by a second user;
   examining file metadata associated with the data in the aggregate data set and, based on the examination of the file metadata, determining whether or not any data in the aggregate data set is shared by the first and second users;
   when a determination is made that some of the data in the aggregate data set is commonly shared by the first user and the second user, deeming a connection to exist between the first user and the second user, and further determining an extent of commonality of data shared by the first user and the second user, and determination of the commonality of the data is based in part on data hashes that were created as part of a data backup process;
   determining and assigning a strength value to the connection between the first user and the second user based on the extent of the commonality of the data; and
   taking, or causing the taking of, an action to improve an operation of the computing system and/or a configuration of the computing system, when the strength value of the connection between the first user and the second user meets or exceeds a threshold.

2. The method as recited in claim 1, wherein some shared data in the aggregate data set is omitted from consideration when a strength value is determined for the connection.

3. The method as recited in claim 2, wherein the omitted shared data comprises system data, and some shared data that is not omitted comprises user-specific data.

4. The method as recited in claim 1, wherein the strength of connection is also based in part on a frequency of use of the shared data by one or both of the first user and the second user.

5. The method as recited in claim 1, wherein the method is performed on an ad-hoc basis, or on a recurring basis.

6. The method as recited in claim 1, where the connection between the first user and the second user is relatively stronger for a relatively larger amount of shared data, and the connection between the first user and the second user is relatively weaker for a relatively smaller amount of shared data.

7. The method as recited in claim 1, wherein the method is performed without user awareness or requiring user cooperation.

8. The method as recited in claim 1, wherein part or all of the method is performed at a data center.

9. The method as recited in claim 1, further comprising generating a social graph that visually illustrates a strength and significance of the connection between the first user and the second user.

10. The method as recited in claim 1, wherein the action taken comprises one or both of a passive action, and an active action.

11. A non-transitory storage medium having stored therein computer-executable instructions which, when executed by one or more hardware processors, perform the following operations:
   identifying, in a computing system, an aggregate data set that includes both data used by a first user and data used by a second user;
   examining file metadata associated with the data in the aggregate data set and, based on the examination of the file metadata, determining whether or not any data in the aggregate data set is shared by the first and second users;
   when a determination is made that some of the data in the aggregate data set is commonly shared by the first user and the second user, deeming a connection to exist between the first user and the second user, and further determining an extent of commonality of data shared by the first user and the second user, and determination of the commonality of the data is based in part on data hashes that were created as part of a data backup process;
   determining and assigning a strength value to the connection between the first user and the second user based on the extent of the commonality of the data; and
   taking, or causing the taking of, an action to improve an operation of the computing system and/or a configuration of the computing system, when the strength value of the connection between the first user and the second user meets or exceeds a threshold.

12. The non-transitory storage medium as recited in claim 11, wherein some shared data in the aggregate data set is omitted from consideration when a strength value is determined for the connection.

13. The non-transitory storage medium as recited in claim 12, wherein the omitted shared data comprises system data, and some shared data that is not omitted comprises user-specific data.

14. The non-transitory storage medium as recited in claim 11, wherein the strength of connection is also based in part on a frequency of use of the shared data by one or both of the first user and the second user.

15. The non-transitory storage medium as recited in claim 11, wherein the operations are performed on an ad-hoc basis, or on a recurring basis.

16. The non-transitory storage medium as recited in claim 11, where the connection between the first user and the second user is relatively stronger for a relatively larger amount of shared data, and the connection between the first user and the second user is relatively weaker for a relatively smaller amount of shared data.

17. The non-transitory storage medium as recited in claim 11, wherein the operations are performed without user awareness or requiring user cooperation.

18. The non-transitory storage medium as recited in claim 11, further comprising generating a social graph that visually illustrates a strength and significance of the connection between the first user and the second user.

19. The non-transitory storage medium as recited in claim 11, wherein the action taken comprises one or both of a passive action, and an active action.

20. A computing device comprising:
one or more hardware processors; and
the non-transitory storage medium as recited in claim 11.

* * * * *